(12) United States Patent
Ebrahim (10) Patent No.: US 8,973,854 B2
(45) Date of Patent: Mar. 10, 2015

(54) FOOD GRATER

(75) Inventor: Taha Jaffer Ebrahim, Central (HK)

(73) Assignee: Abdoolally Ebrahim Housewares Limited, Hong Kong (HK)

( * ) Notice: Subject to any disclaimer, the term of this patent is extended or adjusted under 35 U.S.C. 154(b) by 91 days.

(21) Appl. No.: 13/882,069

(22) PCT Filed: Oct. 28, 2011

(86) PCT No.: PCT/IB2011/054806
§ 371 (c)(1),
(2), (4) Date: Apr. 26, 2013

(87) PCT Pub. No.: WO2012/056426
PCT Pub. Date: May 3, 2012

(65) Prior Publication Data
US 2013/0206883 A1    Aug. 15, 2013

Related U.S. Application Data

(60) Provisional application No. 61/408,653, filed on Oct. 31, 2010.

(51) Int. Cl.
*A47J 43/25* (2006.01)
(52) U.S. Cl.
CPC ..................................... *A47J 43/255* (2013.01)
USPC ........................ 241/93; 241/169.1; 241/273.3

(58) Field of Classification Search
CPC .......... A47J 43/255; A47J 43/25; B02C 17/02
USPC ....................................... 241/93, 169.1, 273.3
See application file for complete search history.

(56) References Cited

U.S. PATENT DOCUMENTS

| | | |
|---|---|---|
| 6,766,972 B1 * | 7/2004 | Prommel et al. ................. 241/93 |
| 7,137,581 B2 * | 11/2006 | Takayama et al. .......... 241/169.1 |
| 7,806,352 B1 * | 10/2010 | Reimann et al. ................. 241/93 |
| 2004/0079820 A1 * | 4/2004 | So .................................... 241/93 |
| 2008/0017737 A1 * | 1/2008 | So et al. .......................... 241/93 |
| 2010/0270406 A1 * | 10/2010 | Grace et al. ..................... 241/93 |

* cited by examiner

*Primary Examiner* — Mark Rosenbaum
(74) *Attorney, Agent, or Firm* — Gloria Tsui-Yip, Esq.; Miskin & Tsui-Yip LLP (57) ABSTRACT

The present invention provides a food grater comprising a body; a cutting means adapted for cutting the food removably mounted inside the body; the body comprising a cutting means aperture adapted for receiving the cutting means and allowing the cutting means to be rotated inside the cutting means aperture; a first food receptacle being defined between the inner walls of the body; a pushing means adapted for pushing the food onto the cutting means being mounted to the body; a driving means adapted for rotating the cutting means mounted to at least one end of the cutting means and the driving means comprising a driving wheel adapted for moving along a surface and a first cover adapted for covering an aperture of the driving wheel.

20 Claims, 6 Drawing Sheets

FOOD GRATER

FIELD OF THE INVENTION

The present invention relates broadly to a food grater. More specifically, the invention relates to a food grater for cutting cheese or other food into small pieces and receiving the food inside the food grater.

BACKGROUND OF THE INVENTION

Originally, a number of different hand-operated rotary drum-type graters have been provided. Typically, in such graters there is a housing or a body having an open-top hopper communicating at its lower end with a cylindrical grating chamber in which is disposed a grating drum, rotatable by a crank mechanism attached to the drum at one end thereof for grating the contents of the hopper. A handle extends from the housing and is pivoted at its distal end to another handle which carries a press plate moveable into and out of the hopper between a loading condition, removed from the hopper to permit food items to be loaded therein, and a pressing condition, disposable in the hopper for engagement with the food to press it against the grating drum. However, the above mechanism requires two hands to operate the grater. One hand is used to press the press plate in order to force the food inside the hopper into the grating drum. Another hand is used to hold the handle to rotate the drum for grating. In addition, the finished food from the cavity of drum will sometimes come out because of the continuous rotating motion of the food grater.

The fact is the above food grater is not so convenient when the user can only use one hand to operate the food grater. After completion of cutting process, the food will leave on the table and the user is required to store the food into other container. The problem to be solved is to use a single to operate the food grater. Another problem to be solved is to provide a unitary body of the food grater comprising a cutting device and a food container for accommodating the food being cut by the cutting device. Another problem to be solved to provide the food grater which can be operated by one hand and two hands. Another problem to be solved is to improve the effectiveness of the cutting capacity of the food grater.

SUMMARY OF THE INVENTION

The present invention provides a food grater comprising a body; a cutting means adapted for cutting the food removably mounted inside the body; the body comprising a cutting means aperture adapted for receiving the cutting means and allowing the cutting means to be rotated inside the cutting means aperture; a first food receptacle being defined between the inner walls of the body; a pushing means adapted for pushing the food onto the cutting means being mounted to the body; a driving means adapted for rotating the cutting means mounted to at least one end of the cutting means and the driving means comprising a driving wheel adapted for moving along a surface and a first cover adapted for covering an aperture of the driving wheel.

Typically, the cutting means comprises a cylindrical structure, a second food receptacle being defined in a hollow portion of the cylindrical structure.

Typically, the cylindrical structure comprises a plurality of apertures on its surface, the cylindrical structure further comprises at least one blade adapted for cutting the food from the first food receptacle being mounted to the rim of the aperture of the cylindrical structure with an angle relative to the outer surface of the cylindrical structure.

Typically, the driving means further comprises a ring-shaped structure adapted for covering the periphery of the driving wheel.

Typically, the ring-shaped structure is a rubber ring.

Typically, the cutting means further comprises a connecting member adapted for mounting the cylindrical structure to the driving wheel.

Typically, the connecting member comprises a plurality of convex elements being mounted on an inner wall of the connecting member, a plurality of receiving holes for receiving the plurality of the convex elements are positioned adjacent to an end the cylindrical structure.

Typically, the connecting member further comprises a locking device adapted for mounting the connecting member to the driving wheel.

Typically, the locking device comprises at least one extending member extended from an inner wall of the driving wheel and a concave region of the outer wall of the connecting member adapted for receiving the at least one extending member of the driving wheel.

Typically, the first cover comprises a plurality of food ejection holes adapted for allowing the food from the second food receptacle to pass through.

Typically, a second cover adapted for covering the plurality of food ejection holes and preventing the leakage of food from the second food receptacle is rotatable mounted to the first cover.

Typically, the first cover further comprises a first cover locking structure adapted for mounting the first cover to the cutting means, the first cover locking structure is mounted in a direction perpendicular to a surface of the first cover, an locking extension adapted to be received by a concave region of the inner wall of the connecting member is extended from an end of the first cover locking structure.

Typically, the body further comprises a handle driving means adapted for rotating the cutting means and preventing the leakage of food from the second food receptacle mounted to an end of the cutting means, the handle diving means comprises a mounting device adapted for mounting the handle driving means to the cutting means.

Typically, the handle driving means comprises a sliding member adapted for moving along a concave region of the handle driving means, a handle is mounted to an end portion of the sliding member.

Typically, the handle driving means further comprises a means for allowing the handle to rotate relative to the sliding member.

Typically, the pushing means comprises a body cover adapted for covering a aperture which is positioned on top of the body.

Typically, the body cover is pivotally mounted to an end portion of the body.

Typically, a wheel is positioned at the end portion of the body.

Typically, a first end of pushing means is mounted to a surface of the body cover, a second end of the pushing means comprises a curve structure adapted for receiving an outer surface of the cylindrical structure.

Typically, the degrees of curvature of the curve structure and the surface of the cylindrical structure are the same.

Typically, the pushing means further comprises a spring mounted between the curve structure and a surface of the body cover.

Typically, the pushing means further comprises a supporting structure mounted between the curve structure and a surface of the body cover, the cross-section of the supporting structure is of a cross shape.

Typically, a concave region of the ring-shaped structure is adapted to receive a convex region of the outer periphery of the driving wheel.

Typically, the pushing means further comprises a pin mounted to an end of the body, the wheel and the body cover are rotatable mounted to the pin.

Typically, the driving means comprising two opposing driving wheels mounted to opposing ends of the cylindrical structure of the cutting means.

Typically, the second cover is of a butterfly shape.

Typically, the cylindrical structure is made of steel.

Typically, at least two apertures of a surface of the cylindrical structure are mounted with a blade in different angles.

Typically, the first food receptacle is communicated with the cutting means aperture.

BRIEF DESCRIPTION OF THE DRAWINGS

This and other objects, features and advantages of the invention will become apparent upon reading of the following detailed descriptions and drawings, in which.

DESCRIPTION OF THE PREFERRED EMBODIMENTS

In a first embodiment, referring to FIG. 1 to FIG. 6, in the present invention, the body 3 of the food grater has two opposing circular apertures forming a cutting means aperture for receiving the cylindrical cutting device 9. The cylindrical cutting device 9 is adapted to be removably mounted inside the cutting means aperture of the body. The inner walls of the body 3 forms the first food receptacle. The first food receptacle is positioned above the cutting means aperture and is connected together. The first food receptacle could be suitable for storing the food, for example, cheese and garlic. The body 3 comprises a top opening positioned on the top of the body 3 and the top opening connects to the first food receptacle which enables the food to enter into the first food receptacle through the top opening of the body 3.

There is a pushing means located at the top of the body 3. The pushing means together with the body cover 1 are mounted above the top opening of the body 3. And the pushing means is mounted to a lower surface of the body cover 1 and is able to push the food towards the cylindrical cutting device 9. The body cover 1 is adapted for covering the top opening of the body 3 and is pivotally mounted to the body 3. In this embodiment, the pushing means comprises a curve structure 2 at its end. A hinge including a pin 10 is defined at the end of the body 3. The body cover 1 is mounted to the pin 10 and can be rotated about the pin 10 to perform a rotating motion to open or close the top opening of the body 3. A wheel 11 being covered by a rubber ring 18 is rotatable mounted to the pin 10. The wheel 11 is used to support and balance the body 3 on a surface and is adapted to slide along a surface with the driving wheels 8 and 14. The rubber ring 18 is adapted to increase the frictional force between the body 3 and a surface in order to save energy to perform the sliding motion. The body cover 1 can be rotated towards the first food receptacle by pressing the top surface of the body cover 1. The curve structure 2 is attached to the lower surface of the body cover 1. The curve structure 2 comprises a curve surface for pressing the food towards the curve outer surface of the cutting device 9. Preferably, the curve structure 2 and the cylindrical cutting device 9 have a same degrees of curvature. This provides a largest contacting area for the curve structure 2 with the cutting device in order to increase the cutting performance of the cylindrical cutting device 9 and provide a balanced force to push the food from the curve structure 2 to the cylindrical cutting device 9. The pushing means and the body cover 1 are of a unitary body or separate parts. Typically, under the pressure made by the pushing means, the rotating motion of the cylindrical cutting device 9 inside the body 3 will allow cutting function of the cylindrical cutting device 9 and cut the food from the first food receptacle. The amount of food being cut by the cylindrical cutting device 9 depends on the speed of rotating motion of the cylindrical cutting device 9 and the amount of the pressure made by the pushing means.

In a second embodiment, a pushing means comprises a spring placed between the curve structure 2 and the body cover 1. When the body cover 1 is closed, the spring will therefore be compressed. The compressed spring can therefore provide a pushing force to push the food to the cylindrical cutting device 9. In this case, when the user operates the food grater, the user is not required to apply vertical force to press on the body cover 1 and can only apply a horizontal force for sliding the food grater along a table or a surface and achieve the same technical result of the first and second embodiments.

In the first embodiment, the cylindrical cutting device 9 is of a hollow cylindrical shape. The cylindrical cutting device 9 is able to be received and rotated inside the cylindrical passageway. The cylindrical cutting device 9 is positioned inside the cutting means aperture of the body 3 so that the cylindrical cutting device 9 can rotate within the cutting means aperture. The connecting members 12 and 13 are used to mount the opposing end portions of the cylindrical cutting device 9 to the pair of the driving wheels 8 and 20. The connecting members 12 and 13 are of ring shapes and are mounted to the opposing open ends of the cylindrical cutting device 9. The connecting members 12 and 13 have a plurality of convex elements or projections on the inner surface of the connecting members 12 and 13. A plurality of receiving holes for receiving the plurality of the convex elements or projections are located at the opposing open ends the cylindrical cutting device 9. Further, the connecting members 12 and 13 have a locking device adapted for mounting the connecting members 12 and 13 to the driving wheels 8 and 20. The locking device includes at least one concave region attached on the outer periphery of the connecting members 12 and 13 and at least one convex element or extension attached on the inner periphery of the driving wheels 8 and 20.

In this embodiment, one pair of ring shaped structures or rubber rings 7 and 14 are installed to the driving wheels 8 and 20. Preferably, the ring shaped structure is made of plastic or rubber to increase friction. Further, when pushing and pulling the food grater along the table or a surface, under the friction of the driving wheels 8 and 20 with the table, such a horizontal motion can allow the driving wheels 8 and 20 to rotate the cylindrical cutting device 9 inside the cutting means aperture of the body 3. As a result, the food grater of the present invention could be operated by using one hand.

Figure 1:
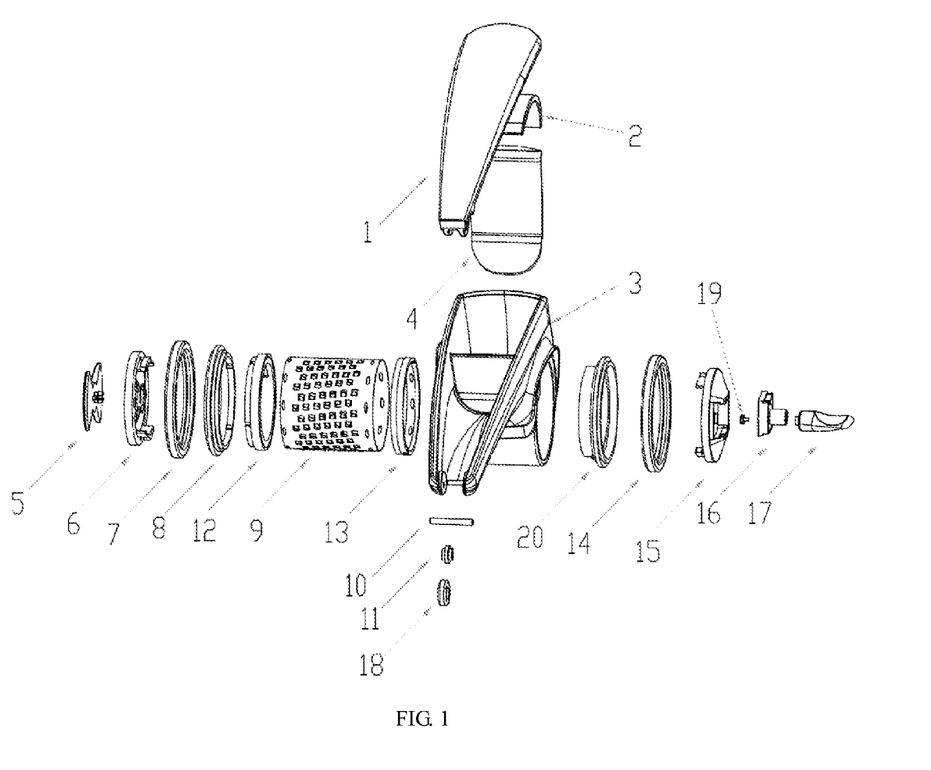
FIG. 1 is an exploded view of a first embodiment of the present invention.
Figure 2:
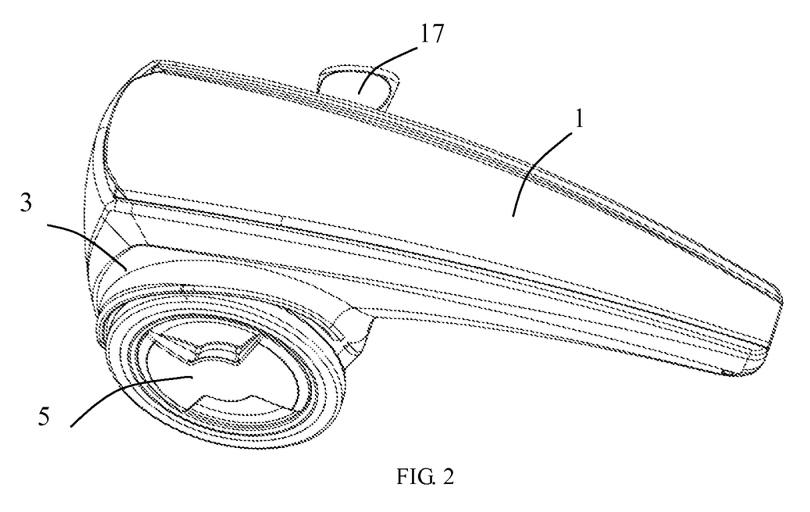
FIG. 2 is a perspective view of the first embodiment of the present invention.
Figure 3:
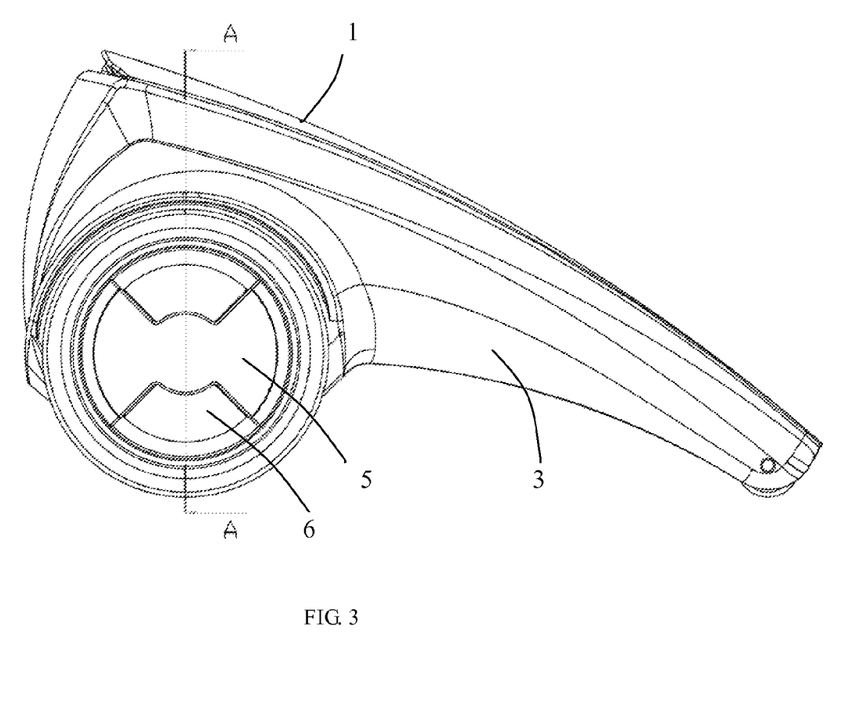
FIG. 3 is a side view of FIG. 2 of the present invention.
Figure 4:
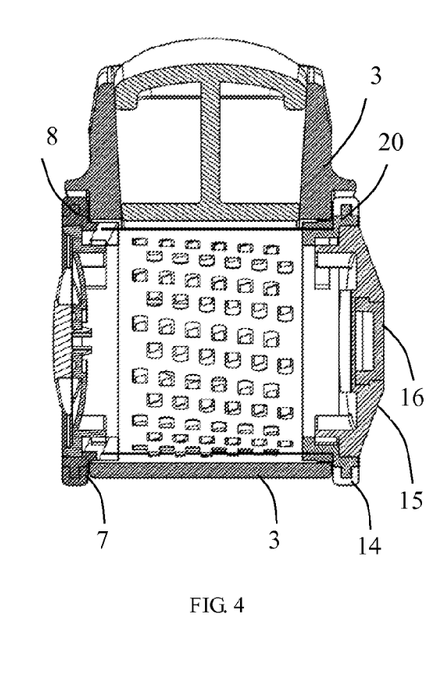
FIG. 4 is a first sectional view A-A of FIG. 3 of the present invention.
Figure 5:
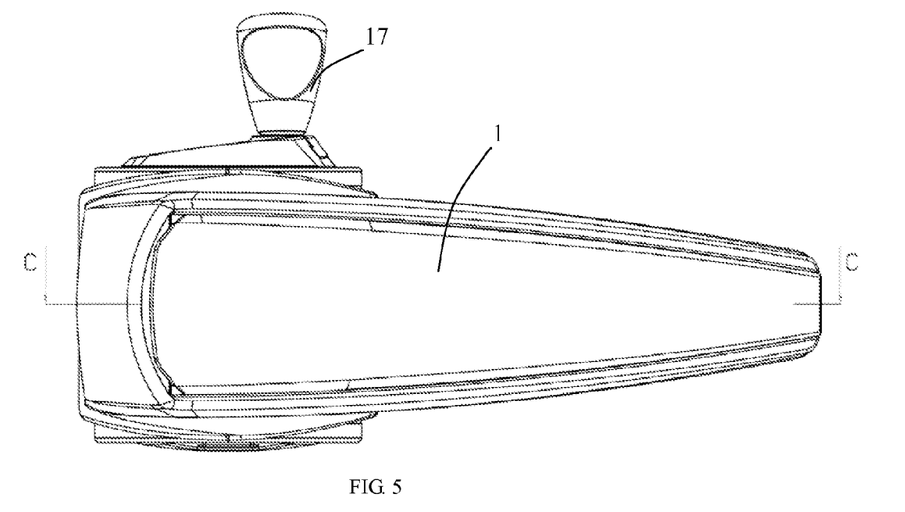
FIG. 5 is a top view of FIG. 2 of the present invention.
Figure 6:
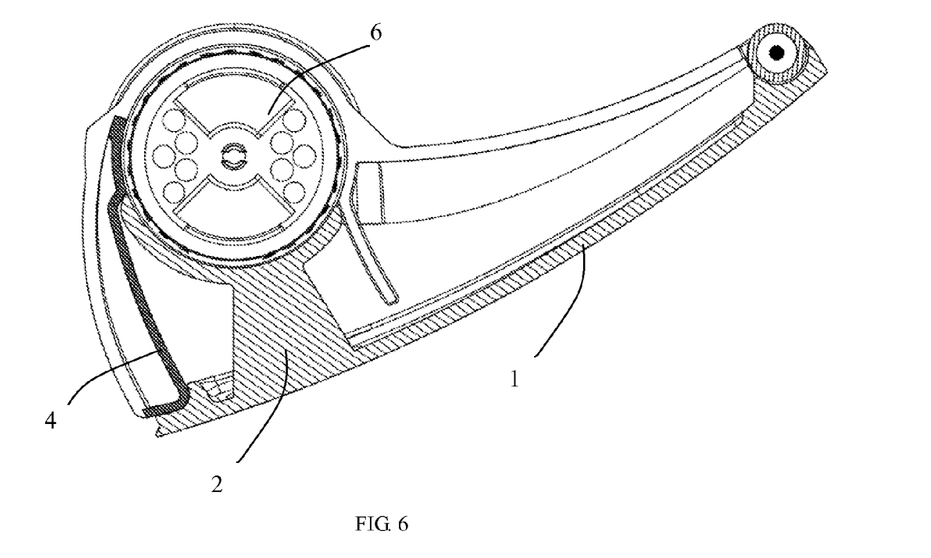
FIG. 6 is a second sectional view C-C of FIG. 5 of the present invention.
Figure 7:
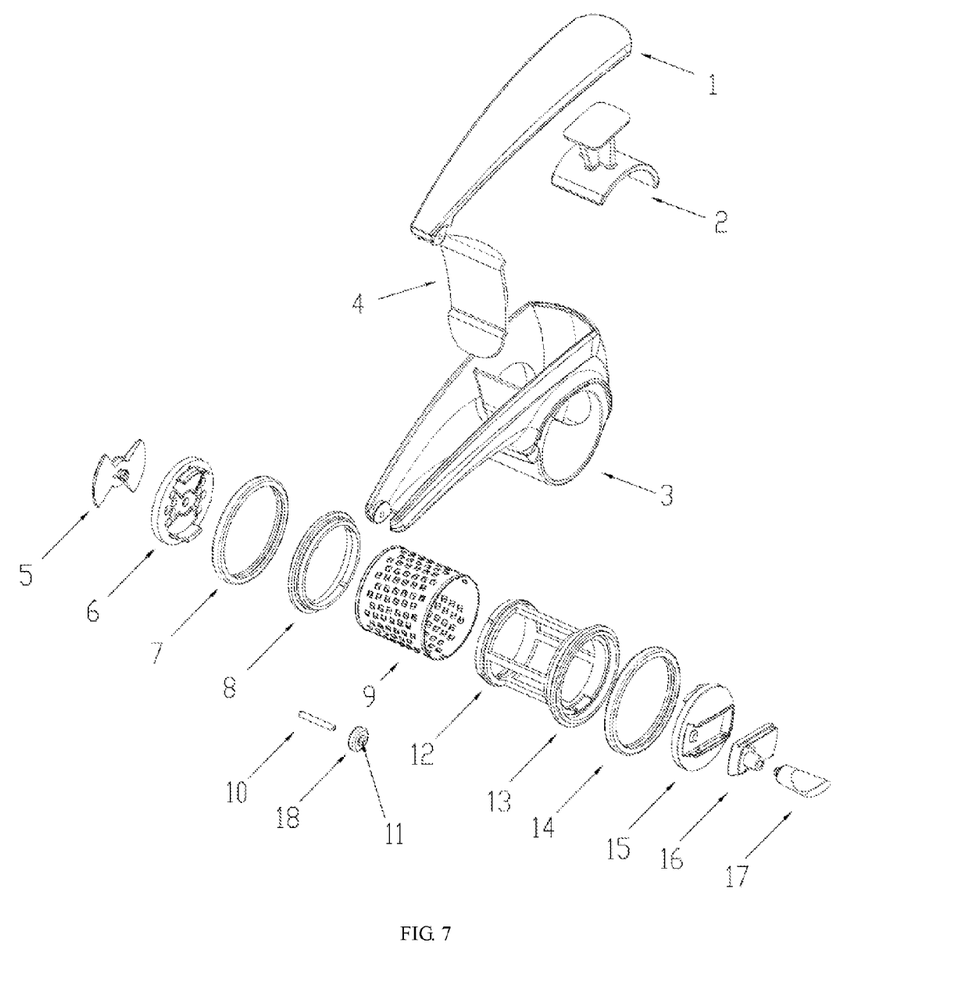
FIG. 7 is a exploded view of a third embodiment of the present invention.

Alternatively, in a third embodiment, referring to FIG. 7, a supporting frame adapted for receiving the cylindrical cutting device has been installed a pair of driving wheels being covered a pair of rubber rings so that the supporting frame could rotate more securely. The supporting frame comprises two opposing rings 12 and 13 which are mounted by at least two bars. The diameter of the two opposing rings is slightly larger than the diameter of the two opposing apertures of the cylindrical cutting device.

In the first embodiment, the cylindrical cutting device 9 has a plurality of the cylindrical cutting device apertures on its surface. Each of the cylindrical cutting device aperture has at least one cutting edge or blade which is used to cut food from the first food receptacle. The blade or the cutting edge is mounted to the periphery of the cylindrical cutting device aperture. The food from the food receptacle is pushed onto the outer surface of the cylindrical cutting device 9 directly by the curve structure 2 of the pushing means. When the cylindrical cutting device 9 rotates, the food from the first food receptacle would be cut by the cutting edges or the blades of the cylindrical cutting device 9 and pass through the cylindrical cutting means aperture to the second food receptacle or a hollow portion of the cylindrical cutting device 9. The food passing through the cylindrical cutting means aperture will be cut into smaller pieces. The food will be finally stored in the second food receptacle or a hollow portion of the cylindrical cutting device 9. Alternatively, the cutting edges or the blades are constructed with different sizes and angles such that the food being cut can have different sizes or shapes when the cylindrical cutting device 9 is rotated in a clockwise or anti-clockwise direction. Preferably, the cylindrical cutting means aperture has two opposite cutting edges or blades with two different angles relative to the surface of the cylindrical cutting device 9.

Further, a first cover 6 is mounted for covering an end of the cylindrical cutting device 9 so that the food from the second food receptacle could be taken out from the cylindrical cutting device 9. Preferably, one or two first covers 6 are made of transparent material mounted to the opposing ends of the cylindrical cutting device 9. The users can therefore be easy to monitor the amount of food inside the cylindrical cutting device 9. The first cover 6 has a plurality of food ejection holes adapted for allowing the food from the second food receptacle to pass through. The diameter of food ejection holes is slightly larger than the diameter of food inside the second food receptacle so that the user can take out them the food from the second food receptacle without removing the first cover 6. Further, a second cover 5 adapted for covering the plurality of circular food ejection holes and preventing the leakage of food from the second food receptacle is rotatable mounted to the first cover 6. The second cover 5 is of a butterfly shape and has a projection adapted for mounting to an aperture positioned at the centre of a surface of the first cover 6. The projection is located at the centre of a surface of the second cover 5. Alternatively, a first cover locking structure is used for mounting the first cover 6 to the cylindrical cutting device 9 through the connecting member 12 or 13. The first cover locking structure is mounted in a direction perpendicular to a surface of the first cover 6, an locking extension adapted to be received by a concave region of the inner wall of the connecting members 12 or 13 is extended from an end of the first cover locking structure.

In this embodiment, a handle driving means 15 can also be mounted to one end of the cutting means. The food grater according to claim 1 wherein a handle driving means adapted for rotating the cutting means and preventing the leakage of food from the second food receptacle is mounted to an end of the cutting means, the handle driving means 15 comprises a mounting device adapted for mounting the handle driving means to the cutting means. Apart from performing one hand operation of the present invention, the user can also use both hands by using the handle driving means 15. The user can use one handle to hold the body 3 and use another hand to rotate the handle driving means 15 in order to drive the cutting means to be rotated inside the body 3. The handle driving means has a sliding member 16 which is able to be moved along a concave region of the handle driving means, a handle 17 is removably mounted to an end portion of a first surface of the sliding member 16. A pin from one end of the handle 16 passes through an aperture of the end portion of the first surface of the sliding member 16. The pin from one end of the handle 16 is fixed to a plastic plug 19 which is mounted to an aperture of a second surface of the end portion of the sliding member 16. As such, the handle 16 can rotate about a position of the aperture of the first surface of the sliding member 16. An end of the sliding member 16 is able to be moved outwardly from the outer periphery of the handle driving means 15. And the sliding member 16 will therefore become an arm of the handle 17. The more the length of the sliding member 16 extended from the outer periphery of the handle driving means 15, the more energy saving for the user to rotate the handle driving means 15 in order to drive the cylindrical cutting device 9 to rotate.

Figure 8:
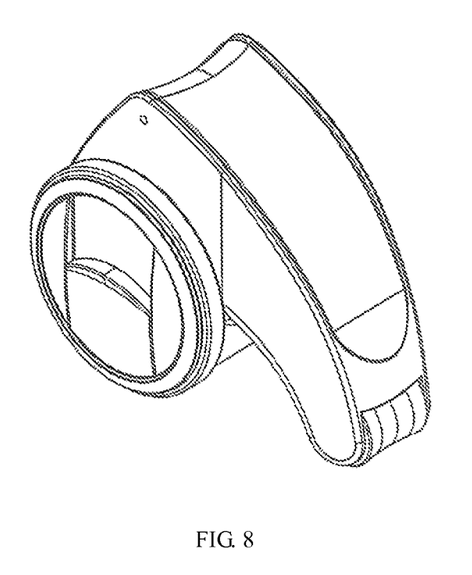
FIG. 8 is a perspective view of a fourth embodiment of the present invention.

In a fourth embodiment, referring to FIG. 8, the food grater includes a body 3 having an opening at its top and a pushing means. Cheese or other food is inserted into the body of the food grater through a top opening. The cavity between the inner surfaces of the food grater and the top opening defines a container or the first food receptacle for receiving the cheese or other food. The pushing means includes a body cover 1 is pivotally mounted to one end of the body 3 of the food grater and is adapted to cover the top opening of the food grater. A pushing plate or the curve structure 2 is mounted to the body cover 1 and is adapted to press the cheese or other food onto the outer surface of the cylindrical structure or drum 9.

The food grater further comprises the drum or the cylindrical structure 9 defining a grating medium to cut the cheese or other food from the container or the first food receptacle. The drum or the cylindrical structure 9 has a number of apertures on its surface and each aperture contains at least one cutting edge or blade. The cheese or other food from the outer surface of the drum or the cylindrical structure 9 or the first food receptacle is forced by the pushing plate or the curve structure 2 to pass through the apertures of the drum or the cylindrical structure 9. The cheese or other food is therefore then grated into smaller pieces by the cutting edges or blades of the apertures. The cutting edges or the blades have different angles. The cheese or other food is therefore to be cut in multiple angles through the cutting edges or the blades of the apertures when the drum or cylindrical structure 9 is being rotated in a clockwise or anti-clockwise direction.

The food grater has a cavity or the cutting means aperture in its body for receiving the drum or cylindrical structure 9. The drum or the cylindrical structure 9 is adapted to be rotated inside the cutting means aperture relative to the body of the food grater. During the grating operation, the finished cheese or food is then stored inside the second food receptacle of the drum or the cylindrical structure 9 defined between the inner surfaces of the drum or the cylindrical structure 9. A pair of first wheels is fixed to the opposing ends of the drum. The user can move the food grater along a surface in order to rotate a pair of the driving wheels (8 and 20) and then drives the drum or the cylindrical structure 9 to rotate clockwisely or anti-clockwisely inside the cutting means aperture of the body.

A wheel 11 is fixed to the bottom end of the body of the food grater. To improve the frictional force of the wheel 11 and the driving wheels 8 and 20, rubber rings 7, 14 and 18 are provided to cover the outer periphery of the wheel 11 and the driving wheels 8 and 20. The wheel 11 helps to balance the whole body of the food grater and secure a linear motion of the food grater along a surface. Alternatively, the driving wheels 8 and 20 and the wheel 11 can be made of plastic, such as rubber, in order to increase the frictional force between the food grater and the surface to save energy for rotating the drum.

The food grater further comprises the first cover 6 for covering one end of the drum or the cylindrical structure 9. The first cover 6 is used to prevent the finished cheese or other food escaped from the storing cavity or the second food receptacle of the drum or the cylindrical structure 9.

Preferably, the first cover 6 is made of transparent material and are adapted to be checked the amount of the finished cheese or food stored inside the drum or the cylindrical structure 9 by the user time by time.

The invention comprises the following technical results:

a. Wheel Driven Two-Way Grater

The wheel is integrated into the blade drum as one single unit which can be rolled on a tabletop for direct grating action. The wheel will be overmolded with soft TPE for increasing its grasping power against the tabletop.

b. Storage System

The food produced by the grater is collected inside the well enclosed blade drum. Two slide covers are present at two ends for different dispensing quantity.

c. One-Hand Operation

The pushing means will be spring loaded that, unlike a typical cheese grater, a constant external force is not needed during the operation. The grating process only involves the intuitive back-and-forth action which is possible for one hand operation.

d. Less Moving Parts and so Less Energy Loss for a More Efficient System

The standard crank arm is eliminated by adopting the direct coupling of the blade drum (wheel) against the tabletop. As there will have no handle knob to rub against the crank arm in a typical cheese grater, the energy loss in the crank mechanism is eliminated.

I claim:

1. A food grater comprising:
a body;
a cutting means adapted for cutting the food removably mounted inside the body;
the body comprising a cutting means aperture adapted for receiving the cutting means and allowing the cutting means to be rotated inside the cutting means aperture;
a first food receptacle being defined between the inner walls of the body;
a pushing means adapted for pushing the food onto the cutting means being mounted to the body;
a driving means adapted for rotating the cutting means mounted to at least one end of the cutting means; and
the driving means comprising a driving wheel adapted for moving along a surface and a first cover adapted for covering an aperture of the driving wheel.

2. The food grater according to claim 1, wherein the cutting means comprises a cylindrical structure, a second food receptacle being defined in a hollow portion of the cylindrical structure.

3. The food grater according to claim 2, wherein the cylindrical structure comprises a plurality of apertures on its surface, the cylindrical structure further comprises at least one blade adapted for cutting the food from the first food receptacle being mounted to the rim of the aperture of the cylindrical structure with an angle relative to the outer surface of the cylindrical structure.

4. The food grater according to claim 1, wherein the driving means further comprises a ring-shaped structure adapted for covering the periphery of the driving wheel.

5. The food grater according to claim 4, wherein the ring-shaped structure is a rubber ring.

6. The food grater according to claim 1, wherein the cutting means further comprises a connecting member adapted for mounting the cylindrical structure to the driving wheel.

7. The food grater according to claim 6, wherein the connecting member comprises a plurality of convex elements being mounted on an inner wall of the connecting member, a plurality of receiving holes for receiving the plurality of the convex elements are positioned on the outer surface of the cylindrical structure.

8. The food grater according to claim 7, wherein the connecting member further comprises a locking device adapted for mounting the connecting member to the driving wheel, the locking device comprises at least one extending member extended from an inner wall of the driving wheel and a concave region of the outer wall of the connecting member adapted for receiving the at least one extending member of the driving wheel.

9. The food grater according to claim 1, wherein the first cover comprises a plurality of food ejection holes adapted for allowing the food from the second food receptacle to pass through, a second cover adapted for covering the plurality of food ejection holes and preventing the leakage of food from the second food receptacle is rotatable mounted to the first cover.

10. The food grater according to claim 9 wherein the first cover further comprises a first cover locking structure adapted for mounting the first cover to the cutting means, the first cover locking structure is mounted in a direction perpendicular to a surface of the first cover, a locking extension adapted to be received by a concave region of the inner wall of the connecting member is extended from an end of the first cover locking structure.

11. The food grater according to claim 1, wherein the body further comprises a handle driving means adapted for rotating the cutting means and preventing the leakage of food from the second food receptacle mounted to an end of the cutting means, the handle diving means comprises a mounting device adapted for mounting the handle driving means to the cutting means.

12. The food grater according to claim 11, wherein the handle driving means comprises a sliding member adapted for moving along a concave region of the handle driving means, a handle is mounted to an end portion of the sliding member, the handle driving means further comprises a means for allowing the handle to rotate relative to the sliding member.

13. The food grater according to claim 1, wherein the pushing means comprises a body cover adapted for covering an aperture which is positioned on top of the body, the body cover is pivotally mounted to an end portion of the body.

14. The food grater according to claim 13, wherein a wheel is positioned at the end portion of the body.

15. The food grater according to claim 13, wherein a first end of pushing means is mounted to a surface of the body cover, a second end of the pushing means comprises a curve structure adapted for receiving an outer surface of the cylindrical structure.

16. The food grater according to claim 15, wherein the pushing means further comprises a spring mounted between the curve structure and a surface of the body cover.

17. The food grater according to claim 15, where the pushing means further comprises a supporting structure mounted between the curve structure and a surface of the body cover, the cross-section of the supporting structure is of a cross shape.

18. The food grater according to claim 4, wherein a concave region of the ring-shaped structure is adapted to receive a convex region of the outer periphery of the driving wheel.

19. The food grater according to claim 2, wherein the driving means comprising two opposing driving wheels mounted to opposing ends of the cylindrical structure of the cutting means.

20. The food grater according to claim 3, wherein at least two apertures of a surface of the cylindrical structure are mounted with a blade in different angles.

\* \* \* \* \*